United States Patent [19]

Tajima

[11] Patent Number: 4,750,162
[45] Date of Patent: Jun. 7, 1988

[54] OPTICAL TRACKING SYSTEM UTILIZING THREE PHOTO-DETECTORS

[75] Inventor: Osamu Tajima, Ibaraki, Japan
[73] Assignee: Victor Company of Japan, Ltd., Japan
[21] Appl. No.: 885,699
[22] Filed: Jul. 15, 1986
[30] Foreign Application Priority Data

Jul. 16, 1985 [JP] Japan .................... 60-156674
Mar. 6, 1986 [JP] Japan .................... 61-49235

[51] Int. Cl.$^4$ .................................... G11B 7/00
[52] U.S. Cl. ............................ 369/46; 369/44
[58] Field of Search .............. 358/342; 250/201; 369/43–47

[56] References Cited

U.S. PATENT DOCUMENTS 4,416,002 11/1983 Oguino et al. .................. 369/44
4,449,212 5/1984 Reno ............................ 369/44

Primary Examiner—Robert L. Richardson
Attorney, Agent, or Firm—Lowe, Price, LeBlanc, Becker & Shur

[57] ABSTRACT

In apparatus for optically reproducing information recorded on an optical recording medium, an optical pickup device is arranged such that three light beams obtained by a diffraction grating are focused to apply first to third light spots to the medium so that the center of the second spot is positioned between $(N-1)^{th}$ and $N^{th}$ tracks and the center of the third spot is positioned between $N^{th}$ and $(N+1)^{th}$ tracks with the center of the first spot being positioned the center of the $N^{th}$ track. First to third photo detectors are provided to receive reflected beams from the first to third light spots and the output signals thereof are supplied to a circuit for reproducing the information of the $N^{th}$ track. In the reproducing circuit, after the output signals are synchronized with each other, the output signals of the second and third photo detectors are supplied to an adder and the sum signal is processed by an adjusting circuit so that the amplitude of a signal component of the $(N-1)^{th}$ and $(N+1)^{th}$ tracks becomes equal to that of a signal component thereof obtained by the first detector. A reproduced signal can be obtained by subtracting the processed signal from the output signal of the first detector.

9 Claims, 8 Drawing Sheets

OPTICAL TRACKING SYSTEM UTILIZING THREE PHOTO-DETECTORS

BACKGROUND OF THE INVENTION

The present invention relates to an apparatus for optically reproducing information recorded at high density on a recording medium by application of light beam spots thereto and detection of light returning therefrom.

Various types of optical reproducing apparatus have been devised hitherto. One known arrangement is to apply a first light beam spot to a recording medium for reading information recorded thereon and further to irradiate second and third light beam spots thereto for track following control.

Generally, the diameter of a light beam spot applied to an information track of a recording medium depends on the wavelength of light emitted from a light source such as laser and the numerical aperture (N.A) of a condensing lens employed therefor. In order to accurately read information signals from a target track without crosstalk resulting from reproduction of adjacent track information, it will be required that the information tracks are formed such that the distance therebetween (track separation) is greater than the diameter of a light beam spot determined in accordance with the wavelength and the numerical aperture.

In optical reproducing apparatus currently used, the wavelength of laser beam is 780 nm and the numerical aperture of a condensing lens is 0.5, whereby the diameter of a beam spot applied to a recording medium becomes 1.28 microms in minimum. Therefore, the track separation is set to 1.6 microns in consideration of prevention of crosstalk, resulting in one hour recording of NTSC signal per one side of a recording medium having 30 cm diameter in the case that the minimum pit length is 0.56 microns. An important problem in the recording/reproducing art relates to the need for a recording medium which can be formed with higher recording capacity. However, the prior art techniques do not produce satisfactory results for meeting requirements in terms of high density recording because difficulty is encountered to achieve the reduction of the distance between information tracks which in turn causes generation of crosstalk.

SUMMARY OF THE INVENTION

The present invention has been developed in order to remove the above-described disadvantage inherent in the prior art reproducing apparatus.

It is therefore an object of the present invention to provide a new and improved apparatus which is capable of accurately reproducing information recorded at higher density on an optical recording medium without generation of crosstalk.

A further object of the present invention is to eliminate a crosstalk component included in a reproduced signal by the aid of light beams for track following control.

With these and other objects which will be become apparent as the description proceeds, an optical reproducing apparatus for reproducing an information signal recorded on tracks of an optical recording medium according to the present invention comprises an optical pickup device for optically picking up the information signal by irradiating the recording medium with light beams wherein light emitted from a light source, being collimated by a collimating lens, is incident on a diffraction grating in order to produce three beams and the produced three beams are respectively focused by a condensing lens to apply first to third light spots to the recording medium. The center of the second light spot is positioned between an $(N-1)^{th}$ track and an $N^{th}$ track of the recording medium and the center of the third light spot is positioned between an $(N+1)^{th}$ track and the $N^{th}$ track thereof with the center of the first light spot being positioned at the center of the $N^{th}$ track which is the object of reproduction. First to third photo detectors are provided for receiving reflected light beams resulted from the first to third light spots, the first photo detector receiving the reflected light beam from the first light spot, the second photo detector receiving the reflected light beam from the second light spot, and the third photo detector receiving the reflected light beam from the third light spot. Also included in the optical reproducing apparatus is a circuit arrangement for reproducing the information signal recorded on the recording medium which is responsive to the output signals of the first to third photo detectors. The circuit arrangement includes delay circuit means for synchronizing the output signals of the first to third photo detectors by aligning the posiitons of the time axes thereof. The output signals of the second and third photo detectors are supplied to an adder for obtaining a sum signal thereof and the sum signal is fed to an amplitude adjusting means in which it is processed so that the amplitude of a signal component of the output signal of the adder corresponding to information read from the $(N-1)^{th}$ and $(N+1)^{th}$ tracks becomes equal to that of a signal component corresponding to information of the $(N-1)^{th}$ and $(N+1)^{th}$ tracks obtained by the first photo detector. The output signal of the amplitude adjusting means is supplied to a subtracter where a difference signal between the output signal thereof and the output signal of the first photo detector can be obtained which is a reproduced information signal without a crosstalk component.

Preferably, each of the second and third photo detectors comprises a pair of photosensitive elements which are disposed such that the line of demarcation therebetween intersects the axis of the reflected light beam incident thereon and is optically parallel to a track of the recording medium, and the optical reproducing apparatus further comprises second subtractor coupled to the second photo detector and third subtractor coupled to the third photo detector, whereby a difference signal between the output signals of the pair of the photosensitive elements of the second photo detector is added to a difference signal between the output signals of the pair of photosensitive elements of the third photo detector by the adder.

When the optical reproducing apparatus is used with the recording medium on which first and second signals distinguishable from each other are in advance recorded on every other track, preferably, the amplitude adjusting means comprises a gain control curcuit or variable attenuator and there is further included means for controlling the gain established in the amplitude adjusting means so that a reproduced signal without a crosstalk component can be stably obtained from the first mentioned subtractor irrespective of exchange of the recording medium. The means for controlling the gain of the amplitude adjusting means includes first and bandpass filters for receiving the output signals of the amplitude adjusting means and the first photo detector respectively and for transmitting the first signals, first and second amplitude detectors for detecting the amplitudes of the output signals of the first and second band-pass filters and for supplying a signal corresponding to the detected amplitudes, and a subtracting circuit for obtaining a defference between the detected amplitudes and for supplying a signal corresponding to the difference to the amplitude adjusting means. The amplitude adjusting means controls the gain on the basis of the signal from the subtracting circuit so that the amplitude of the first signal obtained by the first light spot becomes equal to that of the first signal obtained by the second and third light spots with the center of the first light spot being positioned at the track carrying the first signal and the second and third light spots being respectively positioned between the track carrying the first signal and the track carrying the second signal.

BRIEF DESCRIPTION OF THE DRAWINGS

The features of the present invention will become more readily apparent from the following detailed description of the preferred embodiments taken in conjunction with the accompanying drawings in which.

DETAILED DESCRIPTION OF THE INVENTION

Figure 1:
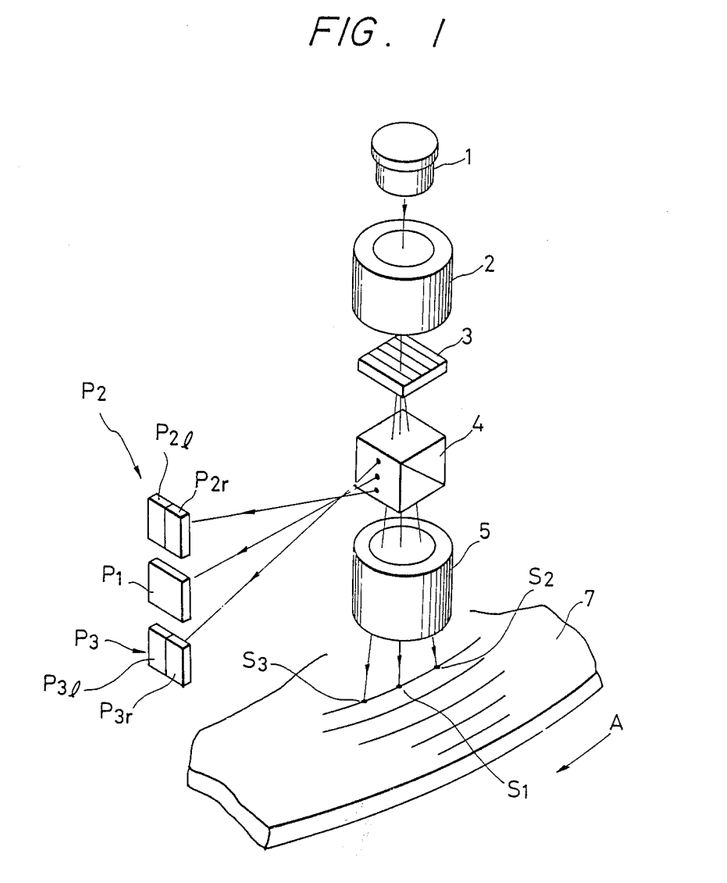
FIG. 1 is a partial illustration of an optically reproducing apparatus according to an embodiment of the present invention.

Referring now to FIG. 1, there is partially illustrated an optically reproducing apparatus of the present invention comprising a light source 1 such as semiconductor laser which has the same structure as conventional light source. Light emitted from the light source 1 is collimated by a collimating lens 2 before reaching a diffraction grating 3 where three beams (zero-order light beam, ± first-order diffracted light beams) are generated. The three light beams from the diffraction grating 3 are respectively incident on a condensing lens 5 (or objective lens) through a beam spliter 4 (or semitransparent mirror) where they are focused to produce microscopic light spots S1, S2 and S3 on a recording medium 7 such as disc. The recording medium 7 is being rotated at a predetermined speed in the direction indicated by an arrow A in the figure.

Light rays reflected from the disc 7 are respectively collimated by the condensing lens 5 and directed by the beam spliter 4 so that they are incident on first to third photo detectors P1 to P3. In this case, the reflected light beam resulted from the first light spot S1 is incident on the first photo detector P1, the reflected light beam from the second light spot S2 is incident on the second photo detector P2, and the reflected light beam resulted from the third light spot S3 is incident on the third photo detector P3.

The second photo detector P2 comprises a pair of photosensitive elements P2l and P2r which are horizontally attached to each other and disposed so that the line of demarcation therebetween intersects the axis of the reflected light beam incident thereon and is optically parallel to information tracks which are formed on the disc 7, so that one of the elements P2l and P2r basically receives information from one of adjacent tracks and the other substantially receives information from the other track. Similarly, the third photo detector P3 comprises a pair of photosensitive elements P3l and P3r which are horizontally attached to each other and which are disposed so that the line of demarcation therebetween intersects the axis of the reflected light beam incident thereon and is optically parallel to information tracks formed thereon.

Figures 2A, 2B:
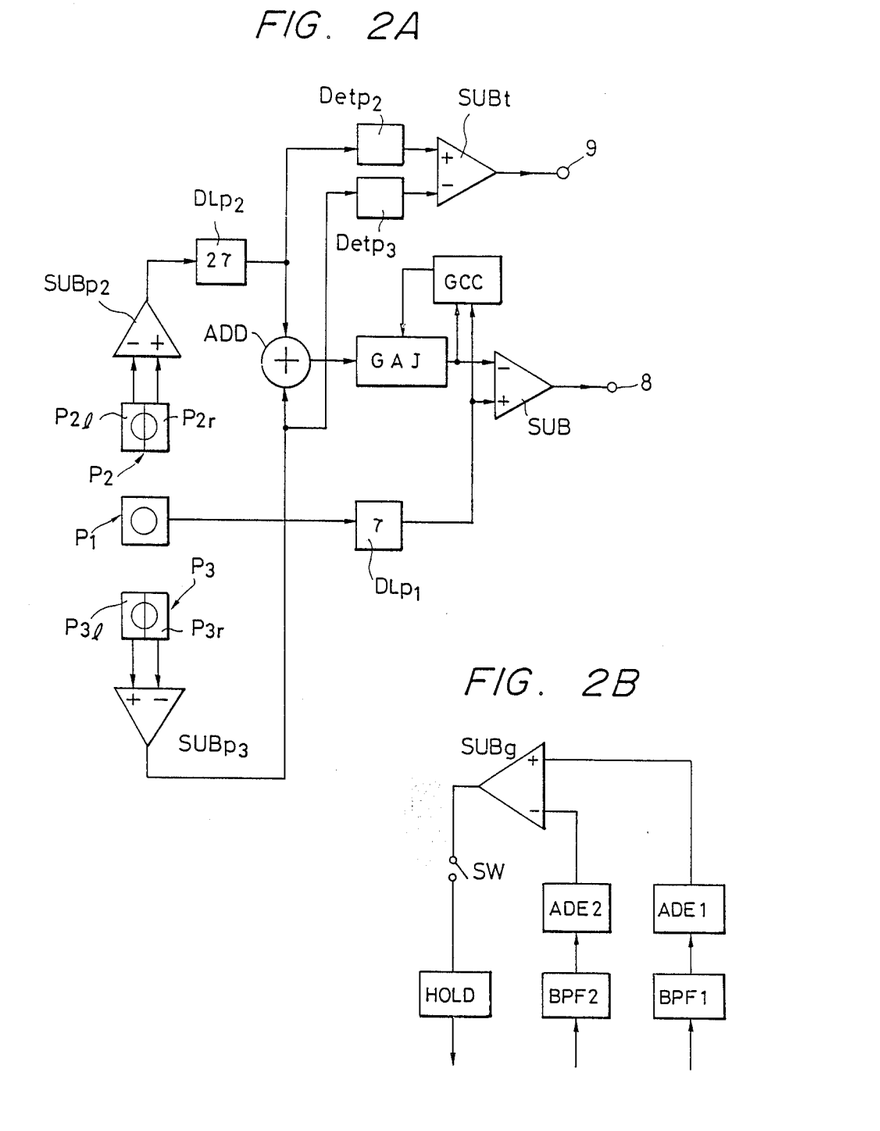
FIG. 2A is a block diagram showing a circuit arrangement for reproducing information recorded on a recording medium.
FIG. 2B is a detailed illustration of a gain control circuit of the circuit arrangement of FIG. 2A.

The output signals of the photo detectors P1 to P3 are supplied to a circuit arrangement shown in FIG. 2A wherein, with a recording medium made such that the distance between information tracks is smaller than the diameter of a light spot applied thereto, a signal processing for eliminating the crosstalk components from a reproduced signal and a signal processing for obtaining a track following control signal are performed whereby a reproduced signal without crosstalk component and a tracking control signal are respectively outputted from output terminals 8 and 9.

A description of the operation of the FIG. 2A circuit arrangement for elimination of crosstalk component will be made hereinafter with reference to FIGS. 3 through 6.

Figure 3:
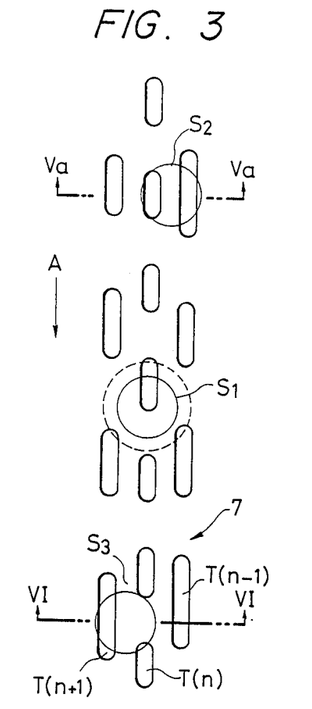
FIG. 3 shows the relation in position between information tracks formed on a recording medium and light beam spots produced by irradiating the recording medium with three beams.

FIG. 3 shows the relation in position between information tracks $T(n-1)$, $T(n)$, $T(n+1)$ provided in the form of successively arranged microscopic areas (pits) and light beam spots S1 to S3 produced by irradiating the recording medium 7 with three beams made through the diffraction grating 3. In FIG. 3, it is illustrated as one example that the first beam spot S1 is incident on the recording medium 7 so that the center of a sphere thereof is positioned to be coincident with the center of the $N^{th}$ information track T(n), the second beam spot S2 is applied thereto so that the center thereof is positioned between the $N^{th}$ information track T(n) and $N-1^{th}$ information track T(n−1), and the third beam spot S3 is formed thereon so that the center thereof is positioned between the $N^{th}$ information track T(n) and $N+1^{th}$ information track T(n+1), where N is a positive integer. As well as the cases of the conventional reproducing apparatus, the diameter of each of the first to third spots S1 to S3 is assumedly 1.28 microns and the track separation successively formed on the recording medium 7 may be 0.8 microns, which is a half the track separation of conventional recording mediums.

Figure 4:
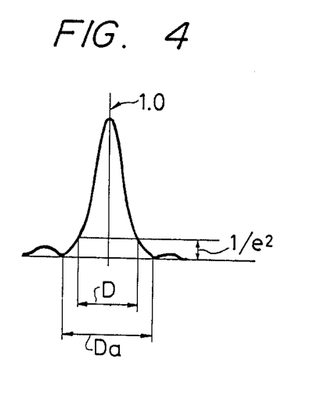
FIG. 4 is an illustration of a Gaussian distribution of optical energies in terms of each of the light spots.

FIG. 4 is an illustration of a Gaussian distribution of optical energies in terms of the cross-section of each of the light spots S1 to S3 formed on a signal surface of the recording medium 7. The light spot diameter is indicated by D which is a width corresponding to the light intensity being $1/e^2$ where e=the base of natural logarithm, whereas Airy disk is indicated by Da, which is illustrated by a dashed line in FIG. 3 only in terms of the light spot S1. Furthermore, a side lobe is developed therearound as shown in FIG. 4. Accordingly, in cases where the diameter of each of the first to third spots S1 to S3 is greater than the track separation, because of overspreading of the side lobe or the main lobe to pits of adjacent tracks, the output signal of the first photo detector P1 obtained by application of the information-reading light spot S1 includes information signals of the adjacent tracks as crosstalk components. On the other hand, as shown in FIG. 3, the second light spot S2 is applied to both the tracks T(n) and T(n−1) and therefore the output signal of the second photo detector P2 obtained by the application thereof includes an information signal of the track T(n) and an information signal of the track T(n−1) in substantially equal proportion. Similarly, because the third light spot S3 is incident on both the tracks T(n) and T(n+1), the output signal of the third photo detector P3 contains an information signal of the track T(n) and an information signal of the track T(n+1) in substantially equal proportion. The depth of each of pits forming the information tracks may be larger than λ/4 and less than λ/2, where λ is the wavelength of light applied thereto.

Figures 5A, 5B:
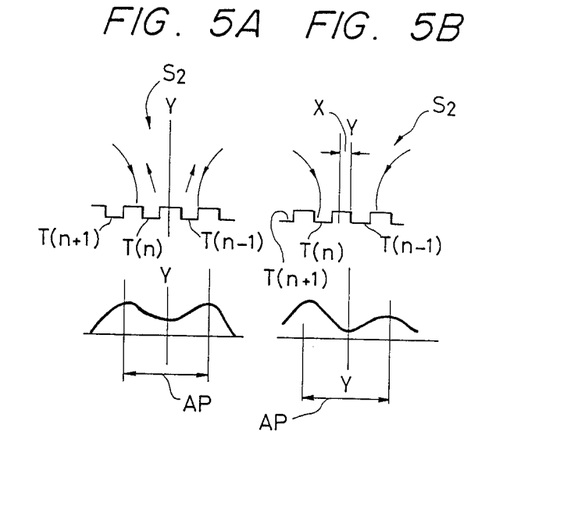
FIG. 5A is a cross-sectional view taken along line Va—Va of FIG. 3 and shows a distribution condition of optical energies of a diffracted light ray resulted from a pit.
FIG. 5B shows a distribution condition of optical energies in the case that the optical axis of a light beam is shifted in a direction.

FIG. 5A is a cross-sectional view taken along line Va—Va of FIG. 3 and shows a distribution condition of optical energies of a diffracted light resulted from pits of the tracks T(n) and T(n−1). The center of the second light spot S2 is positioned between the tracks T(n) and T(n−1), and as a result of such an incidence the diffracted light caused by a pit of the track T(n) is directed to a left direction with respect to the optical axis Y and the diffracted light resulted from a pit of the track T(n−1) is directed to a right direction with respect thereto. Therefore, the higher optical energies are distributed on the periphery of the aperture (AP) of the condensing lens 5 as shown in the figure. In the figure showing the distribution of the reflected optical energies, the light rays distributed within the range AP pass through the aperture of the condensing lens 5 and plunge into the photo detector P2. It will be understood therefrom that the reflected light beam of the left side with respect to the optical axis Y is mainly modulated by a pit (information signal) of the track T(n) while the reflected light beam of the right side with respect thereto is substantially modulated by a pit of the track T(n−1).

FIG. 5B shows a distribution condition of the optical energies in the case that the optical axis Y is shifted by X in the right direction. It will be seen from the figure that in response to the shifting of the optical axis the optical energy of the left side becomes higher than that of the right side, that is, the information of the track T(n−1) is more picked up as compared with that of the track T(n).

Figure 6:
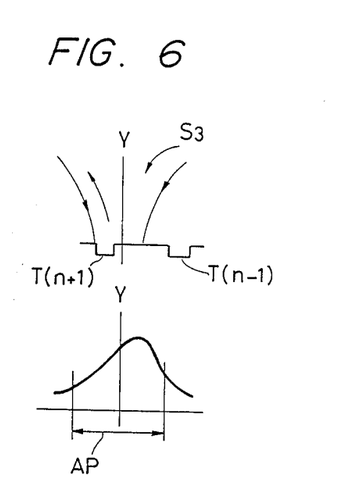
FIG. 6 is a cross-section view taken along line Vl—Vl of FIG. 3 and shows a distribution condition of optical energies of a diffracted light ray.

FIG. 6 is a cross-sectional view taken along line VI—VI of FIG. 3 and shows a distribution condition of optical energies of a diffracted light. In this case, the light spot S3 is not applied to a pit of the track T(n) but applied to a pit of track T(n+1), and therefore the energy distributed at the left side with respect to the optical axis Y is lower than that distributed at the right side because of diffraction.

It will be understood from the above-description that the output signal of the photosensitive element P2l of the photo detector P2 obtained by receiving a reflected light beam from the light spot S2 includes information signals of the track T(n) in a great proportion, whereas the output signal of the photosensitive element P2r obtained thereby includes information signals of the track T(n−1) in a large proportion. Furthermore, the output signal of the photosensitive element P3r of the photo detector P3 obtained by receiving a reflected light beam from the light spot S3 includes information signals of the track T(n) in a great proportion, while the output signal of the photosensitive element P3l obtained thereby includes information signals of the track T(n+1) in a large proportion.

Figure 7:
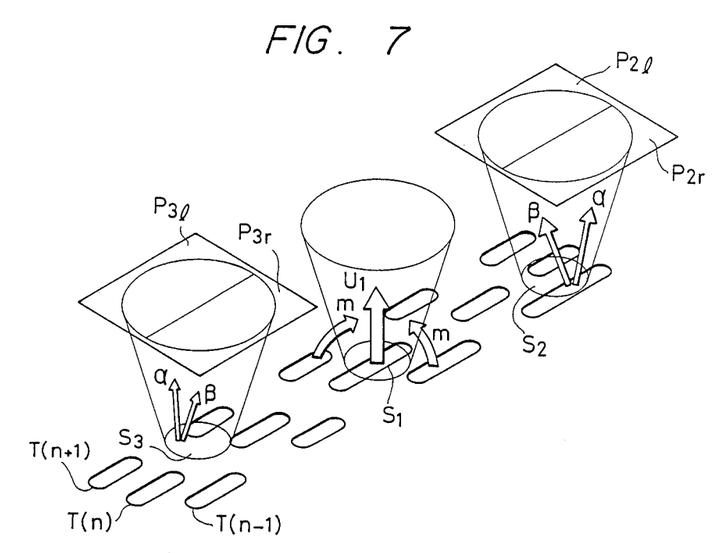
FIG. 7 is an illustration for describing a crosstalk.

The principle of elimination of crosstalk by FIG. 2A circuit arrangement will be described using equations with reference to FIG. 7.

A signal V1 obtained from the photo detector P1 is expressed by the following equation (1).

$$\begin{aligned} V1 &= (1 - k \cdot |X|)U1(t) + (1 + kX)m \cdot U3(t) + \\ &\quad (1 - kX)m \cdot U3(t) \\ &= (1 - k \cdot |X|)U1(t) + m[U2(t) + U3(t) + \\ &\quad \{U2(t) - U3(t)\}kX] \end{aligned} \quad (1)$$

where:
 U1(t)=an information signal recorded in the information track T(n)
 U2(t)=an information signal recorded in the information track T(n−1)
 U3(t)=an information signal recorded in the information track T(n+1)
 m=the ratio of the signal component reproduced from each of the tracks T(n−1) and T(n+1) to the signal component reproduced from the track T(n) in terms of the output signal of the first photo detector P1 in condition of no tracking error
 t=time
 X=tracking error (discrepancy in the right direction is positive)
 k=constant representing an influence of output change caused by the tracking error(0<k<1)

A signal V2r outputted from the photosensitive element P2r of the second photo detector P2 and a signal V21 outputted from the photosensitive element P21 thereof are respectively expressed in accordance with equations (2) and (3). Furthermore, a signal V3r outputted from the photosensitive element P3r of the second photo detector P3 and a signal V31 outputted from the photosensitive element P31 thereof are respectively expressed in accordance with equations (4) and (5).

$$V2r = (1 + kX)\alpha \cdot U2(t + \tau) + (1 - kX)\beta \cdot U1(t + \tau) \quad (2)$$

$$V21 = (1 + kX)\beta \cdot U2(t + \tau) + (1 - kX)\alpha \cdot U1(t + \tau) \quad (3)$$

$$V31 = (1 - kX)\alpha \cdot U3(t - \tau) + (1 + kX)\beta \cdot U1(t - \tau) \quad (4)$$

$$V3r = (1 - kX)\beta \cdot U3(t - \tau) + (1 + kX)\alpha \cdot U1(t - \tau) \quad (5)$$

where:

- $\tau$ = time period taken until the second light spot S2 reaches the position of the first light spot S1 (or until the first light spot S1 reaches the position of the third light spot S3) in accordance with movement of a recording medium
- $\alpha$ = ratio of a signal component corresponding to optical information from a closer track to one of photosensitive elements of the photo detector P2 or P3 to the whole signal components read by the photosensitive element in condition of no tracking error
- $\beta$ = ratio of a signal component corresponding to optical information from the other track to the whole signal components read by the same photosensitive element in condition of no tracking error The output signals of the first to third photo detectors P1 to P3 are produced in accordance with photoelectric conversion of reflected light beams from the first to third light spots S1 to S3 irradiated on a signal surface of a recording medium 7. The first to third light spots S1 to S3 substantially follow the tracks in accordance with the movement of the recording medium 7 in the direction indicated by the arrow A in FIG. 3, and therefore an information signal to be read by the first light spot S1 is read at the time period $\tau$ before by the second light spot S2, while it will be read after the elapse of $\tau$ by the third light spot S3. $\tau$ is therefore used in the above equations (2) to (5) in order to align the positions of the time axes thereof with the position of the time axis in the equation (1).

However, in FIG. 2A circuit arrangement, in order to coincide the output signals of the first to third photo detectors with each other, the output signal of the second photo detector P2 is delayed by $2\tau$ through a delay circuit DLp2 and the output signal of the first photo detector P1 is delayed by $\tau$ through a delay circuit DLp1. Accordingly, there is no need for considering the parameter in terms of time as used in the above equations (1) to (5).

The output signals V21 and V2r of the photosensitive elements P21 and P2r of the second photo detector P2 are first supplied to a subtracting circuit SUBp2 for calculation of V2r−V21. A signal from the subtracting circuit SUBp2 is fed to the delay circuit DLp2 to be delayed by $2\tau$ and then supplied to both an adding circuit ADD and an envelope detector Detp2. On the other hand, the output signals V31 and V3r of the photosensitive elements P31 and P3r of the third photo detector P3 are supplied to a subtracting circuit SUBp3 for calculation of V31−V3r and then fed to the adding circuit ADD and an envelope detector Detp3.

The output signals of the envelope detectors Detp2 and Detp3 are supplied to a subtracting circuit SUBt which in turn produces a tracking error signal and feeds it to the output terminal 9. On the other hand, the output signals (V2r−V21) and (V31−V3r) of the subtracting circuits SUBp2 and SUBp3 are added by the adding circuit ADD to produce a signal as given by the following equation (6).

$$(V2r - V21) + (V31 - V3r) = (1 + kX)(\alpha - \beta)U2 - \quad (6)$$
$$(1 - kX)(\alpha - \beta)U1 + (1 - kX)(\alpha - \beta)U3 -$$
$$(1 + kX)(\alpha - \beta)U1 = [U2 + U3 +$$
$$(U2 - U3)kX](\alpha - \beta) - 2U1(\alpha - \beta)$$

The signal component bracketed in the equation (6) is coincident with the signal component bracketed in the equation (1) which represents a crosstalk component, picked up from the tracks T(n−1) and T(n+1), included in the output signal of the first photo detector P1. Accordingly, if the output signal of the first photo detector P1 (equation 1) is subtracted by the output signal of the adding circuit ADD (equation 6) multiplied by a coefficient $B = m/(\alpha - \beta)$, a signal V expressed by the following equation (7) can be obtained.

$$V = [1 - k|X| + 2m]U1 \quad (7)$$

This signal V is a reproduced signal without a crosstalk component.

In FIG. 2A circuit arrangement, in order to obtain the signal V expressed by the equation (7), a variable gain circuit GAJ (or variable loss attenuator) and a subtracting circuit SUB are provided therein. Namely, the variable gain adjusting circuit GAJ is provided for multiplying the output signal of the adding circuit ADD by the coefficient $B = m/(\alpha - \beta)$ and subtracting circuit SUB is provided for subtracting the output signal of the variable gain circuit GAJ from the output signal of the first photo detector P1 expressed by the equation (1). The output signal of the subtracting circuit SUB, being the reproduced signal V without a crosstalk component shown by the equation (7), is supplied to the output terminal 8. The wideband multiplying circuit (Lnear Four-Quadrant Multiplier, MC1495L) developed by MOTOROLA Co. Ltd can be employed as the variable gain circuit GAJ.

A method of adjustment of the gain established in the variable gain circuit GAJ will be described hereinbelow with reference to FIG. 2B.

Figure 8:
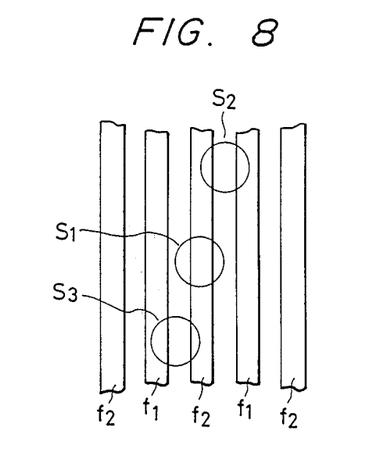
FIG. 8 illustrates two kinds of signals used for gain control.

As shown in FIG. 8, two kinds of signals f1 and f2 distinguishable from each other are recorded in an area of the recording medium 7 which is a portion other than the area at which signals to be reproduced are recorded. The signals f1 and f2 are written on every other track respectively so that tracks carrying the signal f1 and other tracks carrying the signal f2 are arranged alternately. When the light spot S1 is applied to a track in which the signal f2 is recorded, a switch SW is manually or automatically turned on so that the variable gain circuit GAJ is coupled to a gain control circuit GCC which comprises first and second band-pass filters BPF1, BPF2, first and second amplitude detectors ADE1, ADE2, a subtracting circuit SUBg, and a hold circuit HOLD. The output signal of the photo detector P1 is coupled to the first band-pass filter BPF1 which transmits the signal F1 and which is coupled to the first amplitude detector ADE1. On the other hand, the output signal of the variable gain circuit GAJ is supplied to the second band-pass filter BPF2 which also transmits the signal f1 and which is coupled to the second amplitude detector ADE2. The output signals of the first and second amplitude detectors ADE1 and ADE2 are respectively supplied to the subtracting circuit SUBg in order to obtain the difference therebetween. If the variable coefficient B =m/($\alpha-\beta$) established in the variable gain circuit GAJ is unsuitable, the signal f1 recorded in adjacent tracks is included as a crosstalk component in the output signal of the subtracting circuit SUBg. The output signal of the subtracting circuit SUBg which represents the crosstalk component is supplied through the hold circuit HOLD to the variable gain circuit GAJ. The hold circuit retains crosstalk information when the switch SW is turned off. The subtracting circuit SUBg generates a signal with an amplitude corresponding to (m−B), i.e., crosstalk component, in response to the output signals of the first and second amplitude detectors ADE1 and ADE2. The signal therefrom is then suppiled to the variable gain circuit GAJ which in turn adjusts the coefficient B therefore the gain so that a signal f1 detected by the photo detector P1 becomes equal in level to a signal f1 detected by the photo detectors P2 and P3, that is, m=B. As a result of the gain control, a signal without a crosstalk component is supplied from the subtracting circuit SUB to the output terminal 8. The output signal of the subtracting circuit SUBg is polarized, ensuring an accurate operation of the circuit. A circuit for envelope detection comprising a diode, a resistor and capacitor can be used as the amplitude detector ADE, for example.

The gain is not fixed but will be adjusted in response to exchange of the recording medium, because the depth and edge angle of the pit are respectively varied in accordance with the conditions on construction of the recording medium. Therefore, it will be desirable that, although it is appropriate that the tracks carrying the signals f1 and f2 are formed on a recording medium for gain control, the signals f1 and f2 are recorded at portions other than areas at which information signals to be reproduced are recorded.

Each of the pits, as described above, are formed to have a depth larger than $\lambda/4$ and less than $\lambda/2$, where $\lambda$ is the wavelength of the light irradiated, and therefore a signal component from a closer track to one of the two photosensitive elemnets of the photo detector P2 or P3 is included in a greater proportion in the output signal of the photosensitive element as compared with a signal component from the other track. Thus, $\alpha$ is greater than $\beta$, i.e., $\alpha - \beta \rho 0$ and the coefficient B=m/($\beta - \alpha$) is not infinite, resulting in satisfaction of the equations (1) to (7) and an appropriate operation of the FIG. 2A circuit arrangement.

The ratio m of the crosstalk component to the signal obtained from an information track to be reproduced may be about 0.1 (−20db) in the case that the track separation is 0.8 microns and the diameter of each of light spots 1.28 microns. This value is small and therefore the coefficient B=m/($\alpha-\beta$) does not assume a great value.

Furthermore, when the positions of the light spots S2 and S3 are respectively brought near the track T(n−1) and the track T(n+1), the signals U2 and U3 are respectively increased like the case of FIG. 5B and the value of ($\alpha-\beta$) becomes greater and the value of the coefficient B becomes smaller, resulting in stabilization of the circuit. In addition, the reason that the output signals of the photo detectors P2 and P3 are respectively indicated using $\alpha$ and in the equations (21) to (5), is that the light spots S2 and S3 are symmetrically arranged with respect to the track T(n) and the reflected light is symmetrically distributed.

When the light spots S2 and S3 are allowed to approach the tracks T(n−1) and T(n+1) respectively with the center of the light spot S1 being accurately coincident with the track T(n), $\alpha$ and $\beta$ in the equations (3) and (5) can be replaced with coefficients $\gamma$ and $\delta$, and in this case the equation (6) is expressed as follows.

$$[U2+U3+(U2-U3)k'X](\alpha-\delta)-2U2(65-\beta) \qquad (8)$$

For elimination of the crosstalk the coefficient B is set to m/($\alpha-\delta$). The output signal V of the subtracting circuit SUB is as follows.

$$V=[1-k|X|+2m(\gamma-\beta)/(\alpha-\delta)]U1$$

Similarly, this signal V does not include the crosstalk component.

A description of the tracking error signal supplied to the output terminal 9 will be described hereinbelow.

As described above, the output signals V2l and V2r of the two photosenstive elements P2l and P2r of the photo detector P2 are supplied to the subtracting circuit SUBp2 for calculation of (V2r−V2l) and the output signal thereof is supplied to the delay circuit DLp2 to be delayed by $2\tau$ before reaching the envelope detector Detp2, while the output signals V3l and V3r of the two photosensitive elements P3l and P3r of the photo detector P3 are supplied to the subtracting circuit SUBp3 for calculation of (V3l−V3r) and the output signal thereof is directly supplied to the envelope detector Detp2. The output signals of the envelope detectors Detp2 and Detp3 are supplied to the subtracting circuit SUBt which in turn supplies the output terminal 9 with a tracking error signal. Each of the output signal of the envelope detectors Detp2 and Detp3 does not contain pit information and corresponds to a signal indicated by substituting U1(t), U2(t), U3(t) of the equations (2) to (5) by 1. Accordingly, when the output of the envelope detector Detp2 is subtracted by the output signal of the envelope detector Detp3 through the subtracting circuit SUBt, a signal expressed by the following equation (9) can be obtained.

$$V2r-V2l+V3r-V3l=4(\alpha-\beta)kX \qquad (9)$$

Here, since $\alpha$ is greater than $\beta$, the equation (9) shows a tracking error signal propotional to a tracking error X. A low pass filter can be used as the envelope detectors Detp2 and Detp3. The reason is that the signal indicative of the tracking error has a frequency less than 1 KHz and each of the information signals U1(t), U2(t), U3(t) has a frequency more than 1 MHz and thus the signal indicative of the tracking error can be separated from the information signals U1(t), U2(t), U3(t).

When the positions of the light spots S2 and S3 are respectively moved to be brought near or kept away from the information tracks T(n−1) and T(n+1) with the center of the light spot S1 being coincident with the center of the track T(n), $\alpha$ and $\beta$ in the equations (3) and (5) are replaced with $\gamma$ and $\delta$, as a result, the following equation (10) can be obtained which is proportional to a tracking error.

$$2[(\alpha-\beta)+(\gamma-\delta)]kX \qquad (10)$$

The above equations for description of the arrangement and operation of the optically reproducing apparatus according to the present invention are respectively in a linear relationship. This is because, in the optically reproducing apparatus according to the present invention, the influence of tracking error on tracking control operation and the crosstalk are respectively small.

Generally, in an optically reproducing apparatus, a focusing control device will be required to apply a light spot to a recording medium. For that purpose, a focusing error signal can be obtained from light reflected from the light spot S1 in accordance with, for example, the astigmatism method and therefore the focusing control will be easily performed by movement of a condensing lens on the basis of the obtained focusing error signal.

Figure 9:
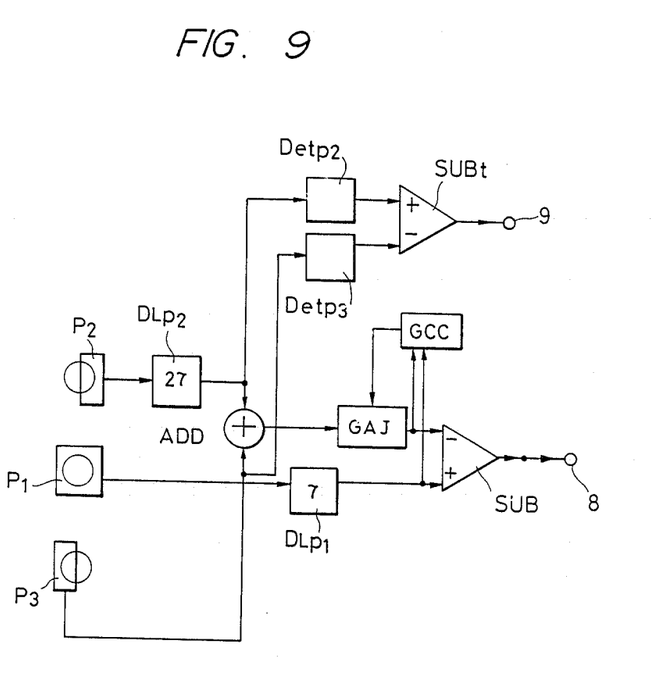
FIG. 9 is an illustration of a modification of the optically reproducing apparatus shown in FIGS. 1 and 2.

FIG. 9 is an illustration of a modification of the present invention. One difference between the reproducing apparatus shown in FIG. 2A and the reproducing apparatus shown in FIG. 9 is that the second and third photo detectos P2 and P3 respectively comprises one photosensitive element. The second photo detector P2 in the FIG. 9 apparatus is arranged at the position of the photosensitive element P2r in the FIG. 2A apparatus, while the third photo detector P3 in the FIG. 9 apparatus is arranged at the position of the photosensitive element P3l in the FIG. 2A apparatus. The output signal V2r of the photo detector P2 includes information of the track T(n−1) in a greater proportion as compared with that of the track T(n) and the output signal V3l of the photo detector P3 includes information of the track T(n+1) in a greater proportion as compared with that of the track T(n+1). Various type of photo detectors comprising one photosensitive element are now available, and therefore, to use such a photo detector results in reduction of cost of the reproducing apparatus.

In the optically reproducing apparatus shown in FIG. 9, the signals V2r and, V3l from the photo detectors P2 and P3 are absent and therefore the equation (6) is rewritten as follows.

$$V2r+V3l = \{U2+U3+(U2-U3) kX\}\alpha + 2U1\beta \qquad (6a)$$

When the signal indicated by the equation (6a) is multiplied by a coefficient $B'=m/\alpha$ and the signal indicated by the equation (1) is subtracted thereby, a signal expressed by the following equation (7a) can be obtained.

$$V=[1-k|X|-2m\beta/\alpha]U1 \qquad (7a)$$

The signal V of the equation (7a) indicates the output signal of the substracting circuit SUB shown in FIG. 9 and does not include crosstalk components U2 and U3. The coefficient $B'=m/\alpha$ is established in the gain control circuit GAJ shown in FIG. 9. As described above, since $\alpha > \beta$ and $m<1$, $2m\beta/\alpha$ in the equation (7a) is sufficiently smaller than 1. Thus, the FIG. 9 apparatus efficiently operates as well as the FIG. 2A apparatus.

The tracking error signal obtained from the subtracting circuit SUBt is expressed as follows.

$$V2r-V3l = 2(\alpha-\beta)kX \qquad (9a)$$

The value of the equation (9a) is ½ as compared with that of the equation (9). However, since the value thereof is proportional to a tracking error X, it is possible to use the signal indicated by the equation (9a) for track follow control.

A further embodiment of the present invention will be described with reference to FIGS. 10 to 12.

Figure 10:
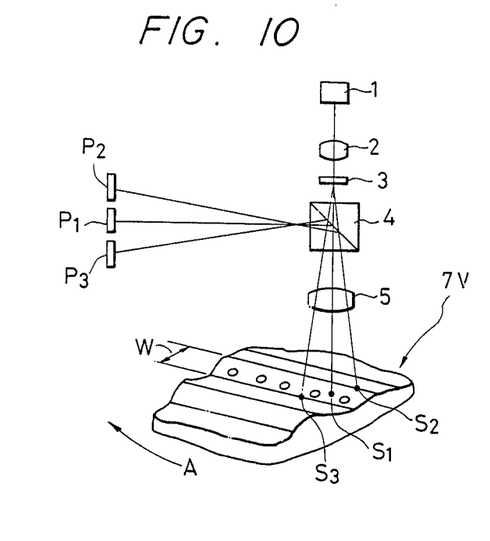
FIG. 10 is a partial illustration of an optically reproducing apparatus according to another embodiment of the present invention.

FIG. 10 shows an optically reproducing apparatus for optically reproducing information from a recording medium on which V-shaped grooves are formed concentrically or spirally and information tracks are formed on slopes of the V-shaped grooves. It is known that the signal reproduced from such a recording medium scarcely includes a crosstalk component. Japanese Patent Provisional Publication No. 59-167989 assigned to the same assignee as the present invention discloses an optically reproducing apparatus which is capable of accurately easily performing a track follow control on reprouction of information from a recording medium with V-shaped grooves. Accordingly, where the present invention is adapted for the optically reproducing apparatus disclosed in the Japanese Patent Provisional Publication No. 59-167989, it is possible to more efficiently perform the prevention of the crosstalk.

In FIG. 10, light emitted from a light source 1 such as semiconductor laser is collimated by a collimating lens 2 before reaching a diffraction grating 3 from which three beams (zero-order light beam, ± first-order diffracted light beams) are generated. The three beams from the diffraction grating 3 are respectively incident on a condensing lens 5 through a beam spliter 4, where they are focused to produce microscopic light spots S1, S2 and S3 on a reproducing medium (disc) 7V. The recording medium 7V is being rotated at a predetermined speed in the direction indicated by an arrow A in FIG. 10. Reflected light rays resulted from the light spots S1 to S3 are respectively returned to the condensing lens 5 to produce parallel beams and then directed by the beam spliter 4 so that they are incident on first to third photo detectors P1 to P3. As well as the case of FIG. 1, the reflected light caused by the first light spot S1 is incident on the first photo detector P1, the reflected light caused by the second light spot S2 is incident on the second photo detector P2, and the reflected light made by the third light spot S3 is incident on the third photo detector P3.

The first photo detector P1 comprises a pair of photosensitive elements P1l and P1r which are horizontally attached to each other and disposed so that the line of demarcation therebetween intersects the axis of the reflected light incident thereon and is optically parallel to the center line of an information track. The second photo detector P2 comprises a pair of photosensitive elements P2l and P2r which are horizontally attached to each other and disposed so that the line of demarcation therebetween intersects the axis of the reflected light incident thereon and is optically parallel to the center line of the information track. The third photo detector P3 comprises a pair of photosensitive elements P3l and P3r which are horizontally attached to each other and which are disposed so that the line of demarcation therebetween intersects the axis of the reflected light incident thereon and is optically parallel to the longitudinal axis thereof.

Figure 12:
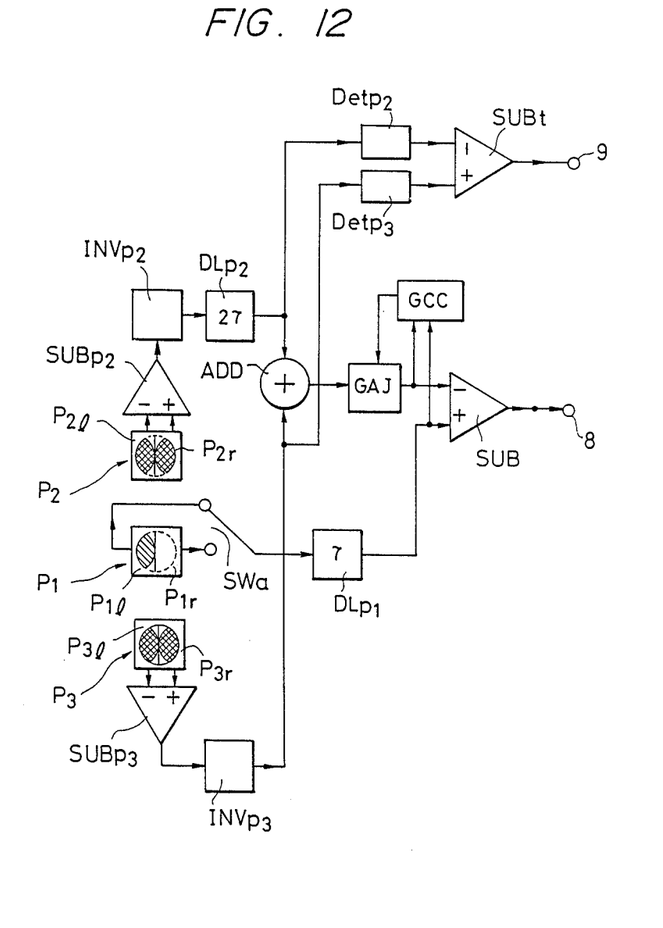
FIG. 12 is a block diagram showing a circuit arrangement used for reproducing information signals in association with the apparatus of FIG. 10.

The output signals of the photo detectors P1 to P3 are supplied to a circuit shown in FIG. 12. As well as the case of FIG. 2A circuit arrangement, in the case that information is reproduced from a recording medium 7V with a track separation smaller than the diameter of a light spot applied thereto, a signal processing for eliminating a crosstalk component from a reproduced signal and for obtaining a track following control signal are effected, whereby a reproduced signal without the crosstalk component and a tracking control signal are respectively outputted from output terminals 8 and 9.

Figure 11A:
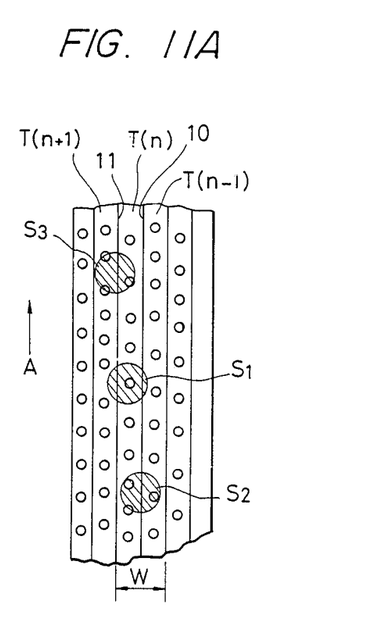
FIG. 11A shows the relation in position between tracks formed on a recording medium and light spots applied thereto.
Figure 11B:
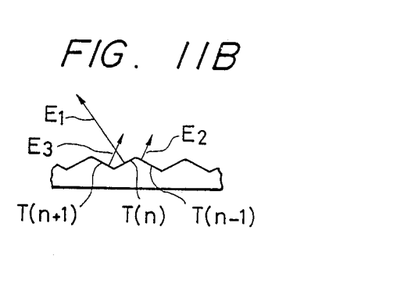
FIGS. 11B to 11D are illustrations of reflected light beam resulted from light beam spots.

The diameter of each of the light spots S1 to S3 irradiated on the recording medium 7V is greater than the width of the track and is smaller than the width of the V-shaped groove (the width of the track is half of the width of the V-shaped groove). As shown in FIG. 11A, with the center of the first light spot S1 being coincident with the center of the $N^{th}$ track T(n), the light spot S1 with a diameter greater than the width of track is applied to the track T(n), the $(N-1)^{th}$ track T(n−1) and the $(N-1)^{th}$ track T(n+1) and therefore the reflected light caused by the light spot S1, as shown in FIG. 11B, comprises a light E1 reflected from the track T(n), a light E2 reflected from the track T(n−1) and a light E3 reflected from the track T(n+1). The phases of the reflected light E2 and the reflected light E3 are substantially opposite to each other and the reflected light beams E2 and E3 are diffused over a wide range due to interference. The reflected light beam E1 is directed in a geometric direction, and the distribution thereof is as shown in FIG. 4 and the intensity thereof is great. The amplitude of reflected light E1 is varied in accordance with the reflectance caused by information signals recorded on the recording medium 7V or pits formed thereon and therefore a signal corresponding to information recorded on the recording medium 7V can be obtained by photoelectric conversion of the reflected light E1.

The reflected light E1 generated when the first light spot S1 is applied to the $N^{th}$ track T(n) formed on one slope of a V-shaped groove is received by the photosensitive element P1l of the first photo detector P1 through the condensing lens 5. This is because the angle of the slope of the V-shaped groove is established so that the reflected light E1 is received by only the photosensitive element P1l. The light's cross-section is similar to the cross-section of a biconvex lens as shown in FIG. 12. On the other hand, the reflected light E1 generated when the light spot S1 is applied to the track formed on the other slope of the V-shaped groove is received by the photosensitive element P1r thereof through the condensing lens 5. The photosensitive element on which the reflected light is not incident receives the diffused light caused by the adjacent tracks and therefore the output signal thereof is useless. Accordingly, the output signals of the photosensitive elements P1l and P1r are outputted through a change-over switch SWa so that only the output signal of the photosensitive element on which the reflected light is incident is picked up, as shown in FIG. 12.

As understood from the above-description, since the adjacent track is formed on the different slope, a crosstalk component resulting from the adjacent track is scarcely included in the output signal of the photo detector P1. However, a crosstalk component is still included slightly therein because the diffused light caused by interference between the reflected light beams E2 and E3 is received by the photo detector P1.

Figure 11C:
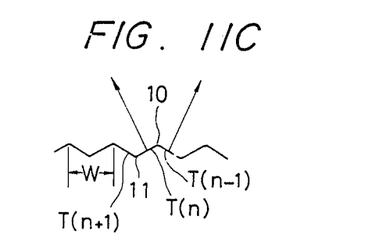
Figure 11D:
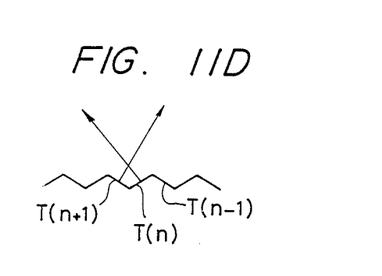

The second light spot S2 is applied to the recording medium 7V so that the center thereof is positioned at the edge 10 between the tracks T(n) and T(n−1) and therefore the reflected light generated by the light spot S2 is divided by the edge 10 into two light beams, as shown FIG. 11C, which are respectively received by the photosensitive elements P2l and P2r of the photo detector P2 in equal proportion. Substantially, the light incident on the photosensitive element P2l is the light reflected from the track T(n) and the light incident on the photosensitive element P2r is the light reflected from the track T(n−1). Therefore, information signal U1 is included in the light incident on the element P2l while signal U2 is included in the light incident on the element P2r. On the other hand, the third light spot S3 is applied to the recording medium 7V so that the center thereof is positioned at the bottom 11 formed between the tracks T(n) and T(n+1) and therefore the light reflected from the track T(n) and the light reflected from the track T(n+1) cross each other as shown in FIG. 11D. The light from the track T(n) contains information signal U1 and is received by the photosensitive element P3l of the photo detector P3, while the light from the track T(n+1) includes information signal U3 and is incident on the photosensitive element P3r thereof.

The output signals V2r and V2l of the photosensitive elements P2r and P2l are respectively indicated by the equations (2) and (3), while the output signals V3r the photosensitive elements P3 is expressed by the equation (4) and the output signal V3l thereof is expressed by the equation (5). Therefore, The connection between the photo detector P3 and a subtracting circuit SUBp3 on the FIG. 12 circit arrangement is made in reverse as compared with that between the photo detector P3 and the subtracting circuit SUBp3 in the FIG. 2A circuit arrangement. The output signal of an adding circuit ADD in the FIG. 12 circuit arrangement is indicated as V2r−V2l+V3r−V3l which is the same as the equation (6). The output signal of the adding circuit Add is processed by a variable gain circuit GAJ and a subtracting circuit SUB for elimination of a crosstalk component, as well as the case of the FIG. 2A circuit arrangement.

In an optically reproducing apparatus for a recording medium with V-shaped grooves in which information is recorded, since operation is performed so that a crosstalk component is not included in the output signal of the photo detector P1, the value of the ratio m is small and the value of the ratio α is large, and therefore the coefficient $B=m/(\alpha-\beta)$ and the correction is not required substantially. Accordingly, in FIG. 12 circuit arrangement, it is possible to more reduce the track separation, resulting in increase in recording density.

In FIG. 12, illustrated at the reference characters INVp2 and INVp3 are invertion circuits for inverting the polarity with information being reproduced from tracks formed on slopes whose directions of inclination are different each other. The invertion is performed in response to the switching of the change-over switch SWa. Therefore, a tracking error signal with a given polarity is outputted from a subtracting circuit SUBt to the output terminal 9 and a track following control can be continuously effected irrespective of variations of direction of inclination of the slope.

Furthermore, in FIG. 12 circuit arrangement, where an adding circuit for the outputs of the photosensitive elements P1l and P1r is provided and the invertion is performed by only the circuit INVp3, it becomes equal to FIG. 2A circuit arrangement. In this case, it is possible to reproduce information from both a recording medium with V-shaped grooves and a recording medium without the V-shaped grooves.

A still further embodiment of the present invention will be hereinafter described with reference to FIGS. 13 to 15. An optically reproducing apparatus according to this embodiment is arranged such that, with the center of the first light spot S1 being positioned at the center of the $N^{th}$ track T(n), the center of the second light spot S2 is positioned on the $(N-1)^{th}$ track T(n−1) and the center of the third light spot S3 is positioned on the $(N+1)^{th}$ track T(n+1). This arrangement enables a photo diode device comprising six parts and commercially available to be used as the photo detectors receiving the reflected light beams produced by the light spots S1, S2 and S3.

Figure 13:
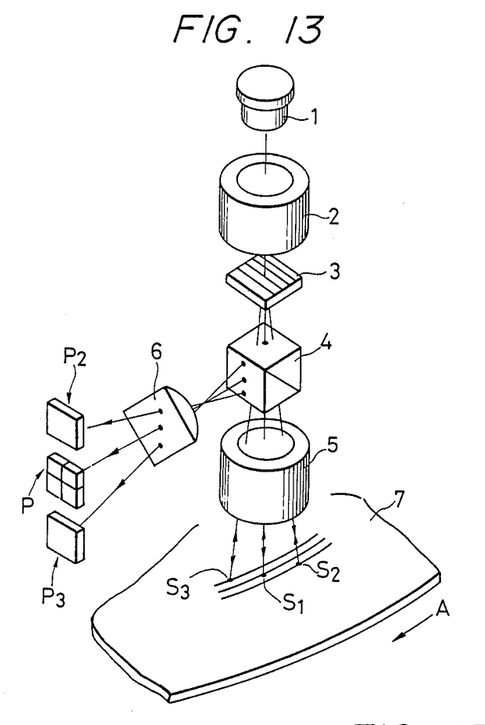
FIG. 13 is a partial illustration of an optically reproducing apparatus according to a further embodiment of the present invention.

In FIG. 13, light emitted from a light source 1 such as semiconductor laser is collimated by a collimating lens 2 before reaching a diffraction grating 3 where three beams (zero-order light beam, ± first-order diffracted light beams) are generated. The three beams from the diffraction grating 3 are respectively incident on a condensing lens 5 through a beam spliter 4 where they are focused to produce microscopic light spots S1, S2, S3 on a recording medium 7.

Figure 14:
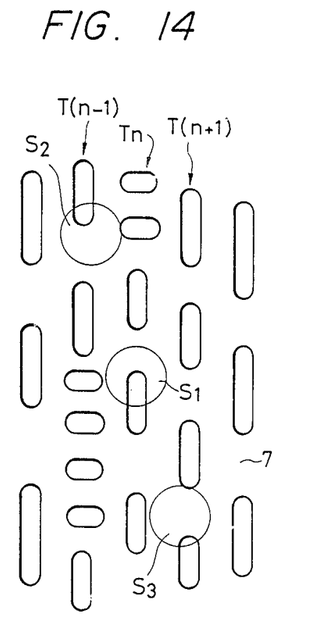
FIG. 14 shows the relation in position between tracks formed on a recording medium and light spots applied thereto.

FIG. 14 shows the relation in position between information tracks successively formed on the recording medium 7 and the light beam spots S1, S2 and S3 applied thereto. In FIG. 14, the centers of the light spot S2 and S3 are respectively positioned to be coincident with the centers of the tracks T(n−1) and T(n+1) with the center of the light spot S1 being coincident with the center of the track T(n), and the distance between the light spots S1 and S2 is equal to that between the light spots S1 and S3.

The reflected light beams produced by the light spots S1 to S3 are respectively collimated by the condensing lens 5 and, after directed by the beam spliter 4, are incident on a cylindrical lens 6 provided for performing the detection of focus error in accordance with the astigmatism method. Thereafter, the light beam from the light spot S1 is incident on the first photo detector P1 which is separated into four portions. The light beam from the light spot S2 is incident on the second photo detector P2 and the light beam from the light spot S3 is incident on the third photo detector P3.

The sum signal of the output signals of the four photosensitive elements of the first photo detector P1 is a reproduced information signal, the difference signal of the output signals of the photosensitive elements arranged in diagonal relation to each other is used as a focus signal, and the difference signal of the output signals of the photosensitive elements disposed on both sides with respect to the tracks is used as a tracking error signal. Basically, the information signal of the track T(n−1) is reproduced by the photo detector P2 and the information signal of the track T(n+1) is reproduced by the photo detector P3. However, the output signal of the photo detector P2 includes the information signal of the track T(n) and also the output signal of the photo detector P3 contains the information signal of the track T(n). The output signals of the photo detectors P1 to P3 is supplied to a circuit arranged as shown in FIG. 15.

The principle of elimination of a crosstalk by FIG. 15 circuit arrangement will be described hereinbelow using equations.

Figure 15:
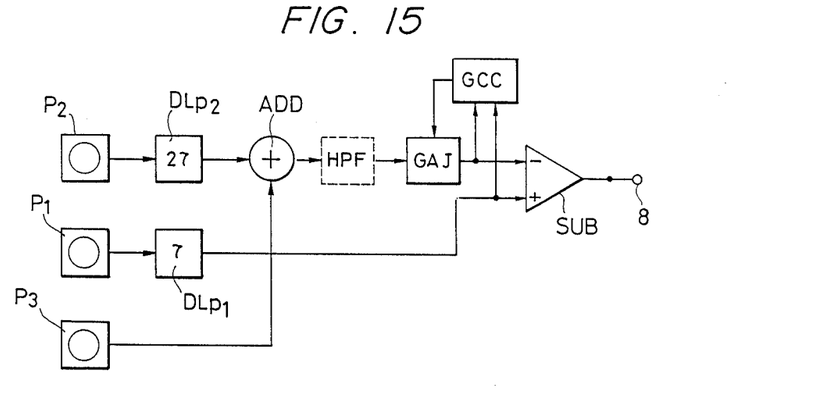
FIG. 15 is a block diagram showing a circuit arrangement used for reproducing information signal in association with the apparatus of FIG. 13.

In FIG. 15 circuit arrangement, A signal V1 obtained from the first photo detector P1 is expressed by the following equation (11) which is equal to the equation (1).

$$V1=(1-k\cdot|X|)U1(t)+m[U2(t)+U3(t)+\{u3(t)-U2(t)\}kX] \quad (11)$$

where:
- U1(t)=an information signal recorded in the information track T(n)
- U2(t)=an information signal recorded in the information track T(n−1)
- U3(t)=an information signal recorded in the information track T(n+1)
- m=the ratio of the signal component reproduced from tracks other than the track T(n) to the signal component reproduced from the track T(n) in terms of the output signal of the first photo detector P1
- t=time
- X=tracking error (discrepancy in the right direction is positive)
- k=constant representing an influence of output reduction caused by the tracking error (0<k<1)

A signal V2 outputted from the second photo detector P2 and a signal V3 outputted from the photo detector P3 are respectively expressed by the following equations (12) and (13).

$$V2=(1-kX)U2(t)+(1-kX)\zeta\cdot U1(t) \quad (12)$$

$$V3=(1+kX)U3(t)+(1+kX)\zeta\cdot U1(t) \quad (13)$$

where: $\zeta$=ratio of signal of the track T(n) obtained by the photo detector P2 or P3 to signal of the track T(n−1) or T(n+1) obtained thereby The first to third light spots S1 to S3 respectively follow the tracks in accordance with the movement in the direction indicated by an arrow A in FIG. 13, and therefore an information signal to be read by the first light spot S1 is read $\tau$ before by the second light spot S2, while it will be read after elapse of $\tau$ by the third light spot S3. In the FIG. 15 circuit arrangement, for synchronizing the output signals with each other, delay circuits DLp1 and DLp2 are provided therein. Therefore, $\tau$ is omitted in the equations (12) and (13).

In FIG. 15 circuit arrangement, the output signal V2 of the photo detector P2 is supplied to a delay circuit DLp2 to be delayed by $2\tau$ and then fed to an adding circuit ADD, while the output signal V3 of the photo detector P3 is directly supplied to the adding circuit ADD. The output signal V2+V3 of the adding circuit ADD is supplied to a variable gain circuit GAJ, if required, through a high-pass filter HPF. When the gain established in the variable gain circuit GAJ is m, the output signal of the variable gain circuit GAJ is expressed by the following equation (14).

$$m(V2+V3)=m[U2+U3+(u3-U2)kX]+2\zeta mU1(1-kX) \quad (14)$$

The signal indicated by the equation (14) is supplied to a substracting circuit SUB wherein the output signal V1 of the photo detector P1 indicated by the equation (11) is subtracted by the signal indicated by the equation (14). As a result, a reproduced signal V without a crosstalk component can be obtained which is indicated by the following equation (15) and supplied to an output terminal 8.

$$V = V1 - m(V2 + V3) = (1 + k|X| - 2|\zeta|m)U1 \quad (15)$$

In FIG. 15 circuit arrangement, the high-pass filter HPF is provided for increasing the correction amount in terms of high frequency signals because the crosstalk component is increased with regard to a high frequency signal with the width of the pit formed on a recording medium being enlarged as compared with the length thereof in association with short recording wavelength. A gain control circuit GCC in FIG. 15 circuit arrangement corresponds to those of the FIG. 2A circuit arrangement.

As seen from FIG. 14, the center of the light spot S2 is positioned on the side of the track T(n) (right side in the figure) with respect to the center of the track T(n−1) and the center of the light spot S3 is also positioned on the side of the track T(n) (left side in the figure) with respect to the center of the track T(n+1). However, it is also appropriate that the center of the light spot S2 and the center of the light spot 3 are respectively positioned on the centers of the track T(n−1) and the track T(n+1). In this case, the output signals V2' and V3' of the photo detectors P2 and P3 are expressed as follows.

$$V2' = (1 - k|X|) \cdot U2(t) + (1 + kX)m \cdot U1(t) + (1 - kX-)m > Un - 2(t) \quad (16)$$

$$V3' = (1 - k|X|) \cdot U3(t) + (1 - kX)m \cdot U1(t) + (1 + kX-)m \cdot Un + 2(t) \quad (17)$$

where:
Un−2(t)=information signal recorded in the track T(n−2)
Un+2(t)=information signal recorded in the track T(n+2)

Accordingly, a signal V' expressed by the flowing equation (18) is outputted from the subtracting circuit SUB.

$$V' = V1 - m(V2' + V3') \approx (1 - k|X|)U1 + 2mk|X|U3 \quad (18)$$

m, k, |X| in the equation (18) are extremely small values, and therefore the crosstalk component (U3) is negligible.

In the case that the center of the light spot S2 is positioned on the side of the track T(n) with respect to the center line of the track T(n−1) and the center of the light spot S3 is also positioned on the side of the track T(n) with respect to the center line of the track T(n+1), the difference signal of the output signals V2 and V3 of the photo detectors P2 and P3 ia used as a tracking error signal. Namely, in the equations (12) and (13), when the signal components U1, U2, U3 are eliminated by envelope detectors, the signals V2" and V3" without signal components U1, U2, U3 are expressed by the following equations (19) and (20).

$$V2'' = (1 - kX) + \zeta(1 - kX) \quad (19)$$

$$V3'' = (1 + kX) + \zeta(1 + kX) \quad (20)$$

The difference signal (V2" − V3") is as follows.

$$V2'' - V3'' = -2kX(1 + \zeta) \quad (21)$$

This equation results in a tracking error signal indicative of the amplitude of a tracking error.

It should be understood that the foregoing relates to only embodiments of the present invention, and that it is intended to cover all changes and modifications of the embodiments of the invention herein used for the purposes of the disclosure, which do not constitute departures from the spirit and scope of the invention. For example, although in the foregoing description an optically reproducing apparatus according to the present invention is arranged such that the coefficient B is corrected using the gain control circuit GCC, if the coefficient is established in advance to match a recording medium to be reproduced, it is not required to provide the gain control circuit in the circuit arrangement shown in FIG. 2A.

Furthermore, although in the foregoing description the apparatus according to the embodiments of the present invention is arranged to reproduce information from a recording medium recorded with pits having a depth larger than λ/4 and less than λ/2, the present invention can be adapted for apparatus which reproduces information from a recording medium with pits having a depth less than λ/4. In this case, the energy distribution of the reflected light ray is reversed in terms of left and right as compared with the distribution shown in FIGS. 5B and 6, and therefore the inverting input terminal and noninverting input terminal of each of the subtracting circuits SUBp2 and SUBp3 are reversed in connection.

What is claimed is:

1. An optical reproducing apparatus for reproducing an information signal recorded on tracks of an optical recording medium, comprising:
   optical pickup means for optically picking up the information signal by irradiating said recording medium with a light beam, said optical pickup means including
   (a) a light source for emitting a light beam,
   (b) a collimating lens for collimating the light beam emitted from said light source,
   (c) an optical device for producing first to third beams in response to an incident.light beam from said collimating lens and for focusing the first to third beams to apply first to third light spots to said optical recording medium so that the center of the second light spot is positioned between an $(N-1)^{th}$ track and an $N^{th}$ track and the center of the third light spot is positioned between an $(N+1)^{th}$ track and the $N^{th}$ track with the center of the first light spot being positioned at the center of the $N^{th}$ track from which information is reproduced, where N is a positive integer, and
   (d) means for separating first to third light beams resulted from reflection of the first to third light beams at said recording medium;
   first to third photo detectors for receiving the first to third reflected light beams from said separating means and for generating first to third electrical signals corresponding to the first to third reflected light beams, said first photo detector receivng the first reflected light from the first light spot, said second photo detector receiving the second reflected light from the second light spot, and said third photo detector receiving the third reflected light from the third light spot; and
   a circuit arrangement responsive to the output signals of said first to third photo detectors for reproducing the information signal recorded on said recording medium, said circuit arrangement including
(a) delay circuit means for aligning in time the output signals of said first to third photo detectors with each other,
(b) an adder for obtaining a sum signal of the output signal of said second photo detector and the output signal of said third photo detector,
(c) amplitude adjusting means coupled to said adder for processing an output signal of said adder so that the amplitude of a signal component of the output signal of said adder corresponding to information read from the $(N-1)^{th}$ and $(N+1)^{th}$ tracks becomes equal to that of a signal component corresponding to information of the $(N-1)^{th}$ and $(N+1)^{th}$ tracks obtained by said first photo detector, and
(d) a subtractor for obtaining a difference signal between an output signal of said amplitude adjusting means and the output signal of said first photo detector.

2. An optical reproducing apparatus as claimed in claim 1, wherein each of said second and third photo detectors comprises a pair of photosensitive elements which are disposed such that the line of demarcation therebetween intersects the axis of the reflected light incident thereon and is optically parallel to a track of said recording medium, said apparatus further comprising a second and third subtractors, said second subtractor being coupled to the pair of photosensitive elements of said second photo detector for obtaining a difference signal between output signals thereof and being coupled to said adder for supplying the difference signal thereto, said third subtractor being coupled to the pair of photosensitive elements of said third photo detector for obtaining a difference signal between output signals thereof and being coupled to said adder for supplying the difference signal thereto.

3. An optical reproducing apparatus as claimed in claim 1, wherein said second photo detector is positioned with respect to the axis of the second reflected light beam incident thereon so that an output signal thereof includes information of the $(N-1)^{th}$ track in a greater proportion as compared with that of the $N^{th}$ track, and said third photo detector is positioned with respect to the axis of the third reflected light beam incident thereon so that an output signal thereof includes information of the $(N+1)^{th}$ track in a greater proportion as compared with that of the $N^{th}$ track.

4. An optical reproducing apparatus as claimed in claim 2, further comprising means for obtaining a track following control signal, said control signal obtaining means including a first envelope detector coupled to said subtractor, a second envelope detector coupled to said third subtractor, and a fourth subtractor coupled to output terminals of said first and second envelope detectors to obtain a difference signal between the output signals thereof.

5. An optical reproducing apparatus as claimed in claim 1, wherein said second photo detector is positioned with respect to the axis of the second reflected light beam incident thereon so that an output signal thereof includes information of the $N^{th}$ track in a greater proportion as compared with that of the $(N-1)^{th}$ track, and said third photo detector is positioned with respect to the axis of the third reflected light beam incident thereon so that an output signal thereof includes information of the $N^{th}$ track in a greater proportion as compared with that of the $(N+1)^{th}$ track.

6. An optical reproducing apparatus as claimed in claim 1, wherein said optical device for producing the first to third light beams and focusing them comprises a diffraction grating and a condensing lens.

7. An optical reproducing apparatus as claimed in claim 1, when said apparatus is used with said recording medium formed such that first and second signals distinguishable from each other are recorded on every other track, said apparatus further comprising a first band-pass filter for receiving an output signal of said first photo detector and for transmitting the first signal, a second band-pass filter for receiving an output signal of said amplitude adjusting means and for transmitting the first signal, a first amplitude detector coupled to said first band-pass filter for detecting amplitude of an output signal of said first band-pass filter and for supplying a signal corresponding to the detected amplitude, a second amplitude detector coupled to said second band-pass filter for detecting amplitude of an output signal of said second band-pass filter and for supplying a signal corresponding to the detected amplitude, and a second subtractor couled to said first and second amplitude detectors for obtaining a difference therebetween and outputting a signal corresponding to the difference to said amplitude adjusting means, said amplitude adjusting means controlling the gain on the basis of the signal from said second subtractor so that an amplitude of the first signal obtained by the first light spot becomes equal to an amplitude of the first signal obtained by the second and third light spots with the center of the first light spot being positioned on the track carrying the first signal and the second and third light spots being respectively positioned between the track carrying the first signal and the track carrying the second signal.

8. An optical reproducing apparatus for reproducing an information signal recorded on tracks of an optical recording medium, comprising:
optical pickup means for optically picking up the information signal by irradiating said recording medium with a light beam, said optical pickup means including
(a) a light source for emitting a light beam,
(b) a collimating lens for collimating the light beam emitted from said light source,
(c) an optical device for producing first to third beams in response to an incident light beam from said collimating lens and for focusing the first to third beams to apply first to third light spots to said optical recording medium so that the second light spot is applied to an $(N-1)^{th}$ track and the third light spot is applied to an $(N+1)^{th}$ track with the center of the first light spot being positioned at the center of the $N^{th}$ track from which information is reproduced, where N is a positive integer, and
(d) means for separating first to third light beams resulted from reflection of the first to third light beams at said recording medium;
first to third photo detectors for receiving the first to third reflected light beams from said direction changing means and for generating first to third electrical signals corresponding to the first to third reflected light beams, said first photo detector receivng the first reflected light from the first light spot, said second photo detector receiving the second reflected light from the second light spot, and said third photo detector receiving the third reflected light from the third light spot; and a circuit arrangement responsive to the output signals of said first to third photo detectors for reproducing the information signal recorded on said recording medium, said circuit arrangement including (a) delay circuit means for aligning in time the output signals of said first to third photo detectors with each other, (b) an adder for obtaining a sum signal of the output signal of said second photo detector and the output signal of said third photo detector, (c) amplitude adjusting means coupled to said adder for processing an output signal of said adder so that the amplitude of a signal component of the output signal of said adder corresponding to information read from the $(N-1)^{th}$ and $(N+1)^{th}$ tracks becomes equal to that of a signal component corresponding to information of the $(N-1)^{th}$ and $(N+1)^{th}$ tracks obtained by said first photo detector, and (d) a subtractor for obtaining a difference signal between an output signal of said amplitude adjusting means and the output signal of said first photo detector.

9. An optical reproducing apparatus as claimed in claim 8, when said apparatus is used with said recording medium formed such that first and second signals distinguishable from each other are recorded on every other track, said apparatus further comprising a first band-pass filter for receiving an output signal of said first photo detector and for transmitting the first signal, a second band-pass filter for receiving an output signal of said amplitude adjusting means and for transmitting the first signal, a first amplitude detector coupled to said first band-pass filter for detecting amplitude of an output signal of said first band-pass filter and for supplying a signal corresponding to the detected amplitude, a second amplitude detector coupled to said second band-pass filter for detecting amplitude of an output signal of said second band-pass filter and for supplying a signal corresponding to the detected amplitude, and a second subtractor couled to said first and second amplitude detectors for obtaining a difference therebetween and outputting a signal corresponding to the difference to said amplitude adjusting means, said amplitude adjusting means controlling the gain on the basis of the signal from said second subtractor so that an amplitude of the first signal obtained by the first light spot becomes equal to an amplitude of the first signal obtained by the second and third light spots with the center of the first light spot being positioned on the track carrying the first signal and the second and third light spots being respectively positioned between the track carrying the first signal and the track carrying the second signal.

* * * * *